United States Patent [19]

Day et al.

[11] Patent Number: 4,948,319

[45] Date of Patent: Aug. 14, 1990

[54] SCREW/CAP ASSEMBLIES AND THEIR MANUFACTURE

[75] Inventors: Robert H. Day, Berkshire; George D. Hewison, Hampshire, both of England

[73] Assignee: UTW Limited, Berkshire, England

[21] Appl. No.: 403,959

[22] Filed: Sep. 7, 1989

[30] Foreign Application Priority Data

Sep. 7, 1988 [GB] United Kingdom ............... 8821023
Jul. 7, 1989 [GB] United Kingdom ............... 8915638

[51] Int. Cl.⁵ .................. F16B 19/00; F16B 33/00
[52] U.S. Cl. ........................... 411/377; 411/372; 411/908; 10/866
[58] Field of Search ............ 411/257, 258, 372, 373, 411/376, 377, 429, 389, 903, 908, 430, 371; 10/27 R, 86 C

[56] References Cited

U.S. PATENT DOCUMENTS

| | | | |
|---|---|---|---|
| 3,470,787 | 10/1969 | Mackie | 411/377 |
| 4,373,842 | 2/1983 | Bettini et al. | 411/903 |
| 4,582,462 | 4/1986 | Thiel | 411/371 |
| 4,764,070 | 8/1988 | Baltzell et al. | 411/430 |
| 4,826,380 | 5/1989 | Henry | 411/377 |

Primary Examiner—Neill R. Wilson
Attorney, Agent, or Firm—Schwartz & Weinrieb

[57] ABSTRACT

It is known for colored plastics caps to be pushed by a customer onto heads of metal screws, after the screws have been secured to sheets of colored cladding or roofing. It is also known for the caps to be molded around the screw heads by a manufacturer. In the present invention, a screw/cap assembly is formed by bonding an initially separate cap onto the head of a screw by means of an adhesive, such as an epoxy resin sufficiently strong to allow the screw to be driven while the cap is in place. The intention is that the manufacturer would maintain stocks of the caps and stocks of the screws of different types, and only secure predetermined caps onto the heads of predetermined screws in response to specific orders from customers.

16 Claims, 4 Drawing Sheets

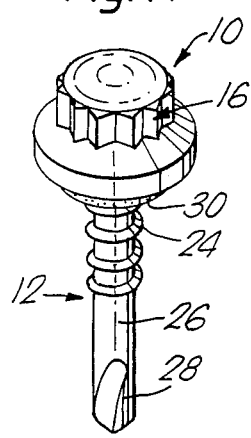
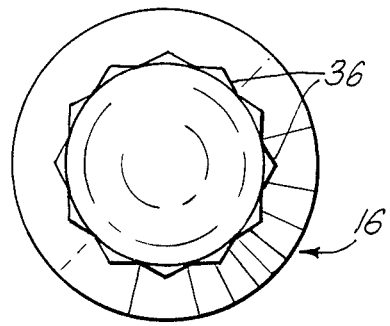
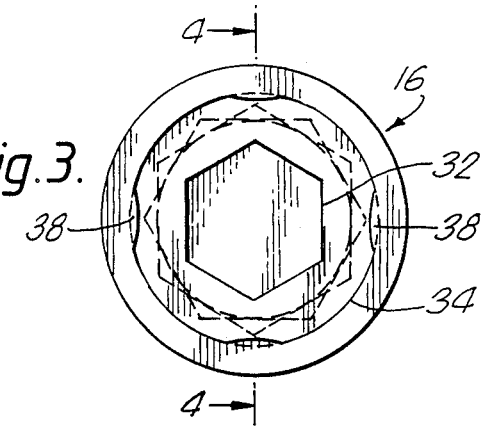
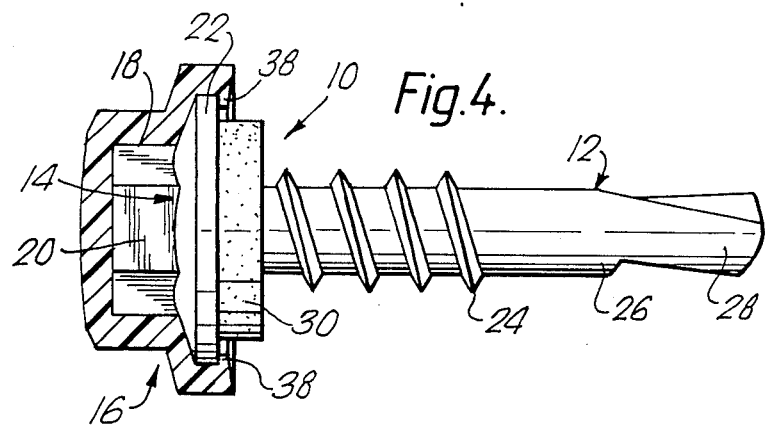

SCREW/CAP ASSEMBLIES AND THEIR MANUFACTURE

FIELD OF THE INVENTION

The present invention relates generally to screw fasteners, and more particularly to screw fasteners having caps disposed upon the head portions thereof in order to form screw/cap assemblies.

BACKGROUND OF THE INVENTION

It is known for the appearance and weather resistance of screws to be improved by mounting caps onto the heads of the screws so as to form screw/cap assemblies.

More particularly, modern buildings often have cladding or roofing of a color different from the color of the screws used to fasten the cladding or roofing to the underlying foundation. The heads of the screws can be visually obtrusive, appearing from a distance as rows of dots against an otherwise uniformly colored background. When exposed to the weather, the heads of the screws can become attacked by means of the atmosphere and thereby develop rust, and this can lead to weakening of the structural integrity of the screw as well as further detracting from the desired overall visual impression of the building structure.

In an attempt to overcome these disadvantages, colored caps have been applied by hand to the heads of the screws after the screws have been threadly inserted. The caps can be formed of a plastic material and the screws can be formed of a metallic material. The colored caps can then blend with the colored background so as to disguise the presence of the screws and to protect the screws from the weather. Unfortunately, not only is the application of the caps to the heads of the screws a time-consuming operation, but the caps tend to fall off the heads of the screws.

The conventional answer to these additional problems has been to mold the caps around specially shaped heads of the screws in for example an insert-molding machine. Although technically successful it requires the manufacturer to maintain large stocks if long delivery times are to be avoided. Maintenance of large stocks is expensive because there is a need for more than forty different colors or types of caps and approximately ten different types or lengths of screws.

SUMMARY OF THE INVENTION

According to the present invention, however, a screw/cap assembly comprises a screw having a head at one end which is capped by means of an initially separate cap mounted onto the head of the screw by means of an adhesive.

The intention is that the manufacturer would maintain stocks of the caps and stocks of the screws and only secure predetermined caps onto the heads of predetermined screws in response to specific orders from customers.

Use of a standard adhesive of the type which can be cured with heat, for example an epoxy resin which cures when placed within a hot oven or otherwise heated for approximately one half hour, allows the cap to be firmly bonded to the head of the screw and permits the screw to be used in a conventional manner with conventional equipment.

Preferably, the head includes an external drive portion extending from a radially enlarged washer portion, and the cap includes an internal drive portion extending from a radially enlarged recess portion. The drive portions may be of hexagonal outline. The washer portion of the head may be fully received within the recess portion of the cap when the two drive portions are fitted together.

The recess portion of the cap may be formed with inwardly directed protrusions for snap engagement with the washer portion of the head. This allows the cap to remain upon the head of the screw while the adhesive between the cap and the head of the screw is being cured. Alternatively, at least one of the cap drive portion and the cap recess portion may have a plurality of internal protrusions for defining a space within which an adequate thickness of the adhesive can be maintained. In either case, there may be a radial clearance defined between the peripheries of the head washer portion and the cap recess portion for defining an adhesive reservoir.

Preferably, the adhesive is applied during manufacture to each of the hexagonal faces of the head drive portion as well as to the head washer portion.

It is desirable for there to be an axial clearance between that end of the head drive portion remote from the head washer portion and that end of the cap drive portion remote from the cap recess portion for defining an air reservoir. It is then desirable for that end of the cap drive portion remote from the cap recess portion to be deformed inwardly during manufacture into the air reservoir before the same resiliently recovers so as to help achieve a uniform distribution of the adhesive.

The cap is preferably formed of a plastic material, in a desired color, with a conventional external torque receiving configuration formed by, for example, a hexagon or a double hexagon.

The screw is preferably formed of a metallic material, in a conventional manner, and may include a drill tip as well as an external helical thread.

BRIEF DESCRIPTION OF THE DRAWINGS

Two screw/cap assemblies, in accordance with the present invention, will now be described, by way of example only, with reference to the accompanying drawings, in which like reference characters designate like or corresponding parts throughout the several views, and wherein:

FIG. 1 is a perspective view of a first screw/cap assembly constructed in accordance with the present invention;

FIGS. 2 and 3 are, respectively, top (external) and bottom (internal) views of the cap per se of the screw/cap assembly shown in FIG. 1;

FIG. 4 is a cross-section taken along the line 4—4 of FIG. 3, also showing the screw of the screw/cap assembly shown in FIG 1;

DETAILED DESCRIPTION OF THE ILLUSTRATED EMBODIMENTS

Figure 5:
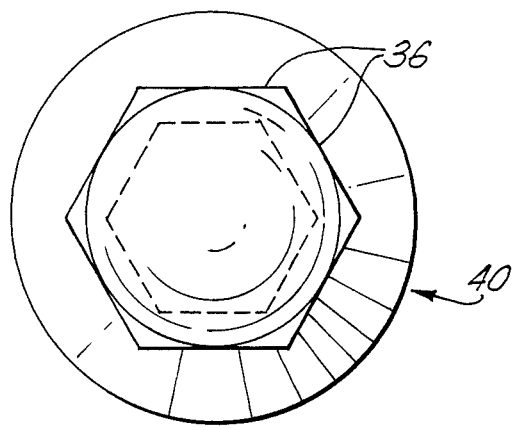
FIGS. 5 and 6 are, respectively, top (external) and bottom (internal) views of a cap per se for use in a second screw/cap assembly constructed in accordance with the present invention.

With reference to FIGS. 1 to 4 of the accompanying drawings, a first screw/cap assembly 10 constructed in accordance with the present invention comprises a screw 12 having a head 14 at one end which is capped by means of an initially separate cap 16 secured upon the head 14 by means of an adhesive 18.

The screw 12 may be formed of steel and may carry a protective coating of paint. The head 14 may include a hexagonal drive portion 20 extending from a radially enlarged and domed washer portion 22. A threaded portion 24 may extend axially from the head 14 along shank 26 towards a drill portion 28 formed at the other end of the screw 12.

A rubber washer 30 may annularly surround the threaded portion 24.

The cap 16 may be molded of a plastic material, such as 20% glass filled polyester, and may be colored during its manufacture by conventional coloring agents. The cap 16 may include an internal hexagonal drive portion 32 extending from a radially enlarged recess portion 34. Externally, the cap 16 may have conventional torque receiving surfaces 36 arranged as a double hexagon. Internally, the recess portion 34 may be provided with a series of four circumferentially spaced and inwardly directed protusions 38 for holding the cap 16 upon the head 14 while the adhesive 18 sets, dries or cures.

It has been found that a particularly suitable adhesive is an epoxy resin which is applied to the hexagonal drive portion 20 and to the upper surface of the washer portion 22 of the screw head 14. After application of the adhesive, the cap 16 is placed upon the head 14 in correct orientation, that is flat surface opposite flat surface. The cap is then pushed down so as to snap engage the retaining protrusions 38 with the undersurface of the domed washer portion 22 of the screw head, and the whole assembly is then removed so as to be cured within an oven for approximately 30 minutes.

Other adhesive processes are possible, for example it is possible to coat either the outside of the screw head 14 or the inside of the screw cap 16 with a hot melt or thermoplastic adhesive. After coating, these elements may be stored until required, whereafter they may be retrieved and heated until the adhesive melts whereupon the coated screws can be assembled to the caps or the coated caps can be assembled to the to the screws. Various methods of heating the individual elements can be employed. The screw heads can be heated by direct gas flame, concentrated infra-red heat or by induction heat. The caps can be heated by hot air, infra-red gas flame or micro-wave energy.

Finally, the assemblies are cooled until the adhesive has hardened.

Figure 6:
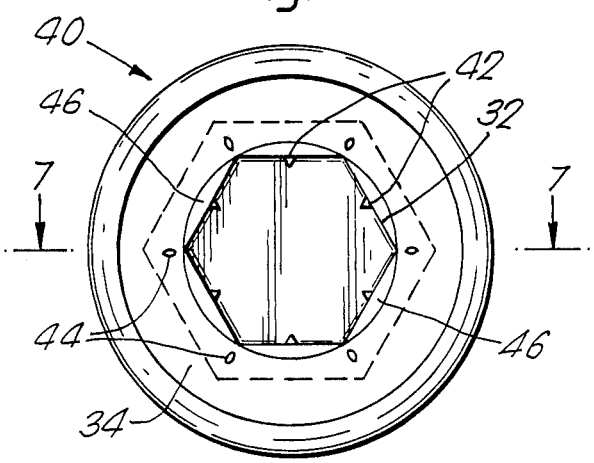

In the alternative cap 40 of FIGS. 5 and 6, it will be noted that the torque receiving surfaces 36 have been arranged as a single hexagon and that the inwardly directly protrusions 38 have been omitted. Instead, the internal hexagonal drive portion 32 is provided with a plurality of axially extending ribs or protrusions 42, one being shown centrally upon each face of the hexagonal drive. Moreover, the internal recess portion 34 is provided with a plurality of radially arranged pips or protrusions 44, one being shown at each junction of the hexagonal drive portion 32 with the internal recess. It is convenient if co-planar flats 46 are provided between the pips 44 for assistance in tooling.

The purpose of the ribs 42, which have been shown in an enlarged form for purposes of clarity and may in practice be smaller, is fourfold:

(a) They centralise the head 14 while permitting the internal dimensions of the cap 40 to be greater than the external dimensions of the head 14;
(b) They grip the head 14 and thereby retain the cap 40 in position while accommodating small tolerances in their actual dimensions;
(c) They create a passage around the head 14 through which air is permitted to escape during assembly so that the air does not become trapped; and
(d) They create a volume which can be filled with the adhesive 18 without the adhesive being squeezed out during assembly.

In a similar manner the pips 44 act as stops to ensure that the cap 40 can be pushed down onto the head 14 only to a limited degree, sufficient to define a space or gap within which an optimum thickness of the adhesive 18 can be disposed between the upper surface of the washer portion 22 and the adjacent surface of the recess portion 34.

Figure 7:
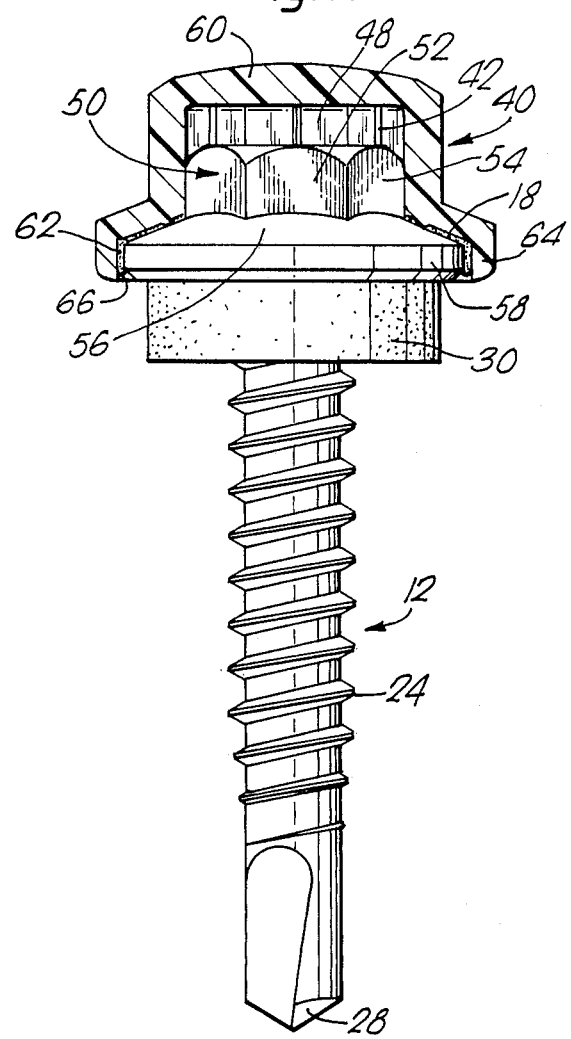
FIG. 7 is a cross-section taken along the line 7—7 of FIG. 6, also showing the screw of the second screw/cap assembly.

With reference to FIG. 7, it will be seen that there is a substantial axial clearance 48, preferably amounting to between 20% and 50% of the axial height of the internal hexagonal drive portion 32 of the cap 40, which is not filled with the adhesive 18 but remains full of air.

During assembly, a predetermined amount of the adhesive 18 is applied to predetermined positions upon the screw head, such as screw head 50. The adhesive 18 is preferably applied to each hexagonal face 52 of its drive portion 54 and to at least the adjacent part of the upper frusto-conical face 56 of its washer portion 58.

Figure 8:
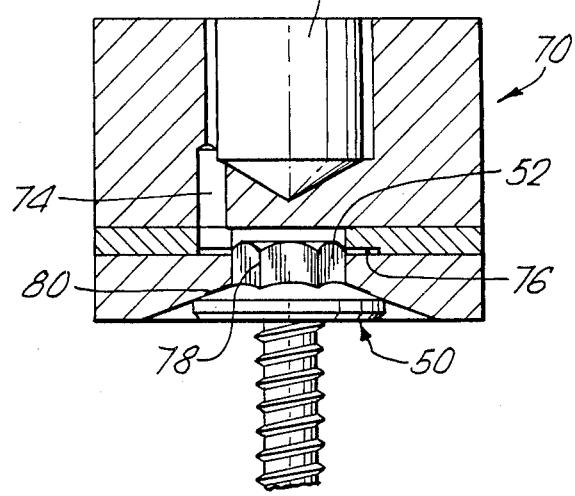
FIG. 8 is a schematic cross-section through an adhesive applicator for use with the first and second screw/cap assemblies.

The adhesive 18 could be applied automatically by means of an appropriate adhesive applicator 70, as shown in FIG. 8. The adhesive applicator 70 includes a reservoir 72 linked by means of a passage 74 to an annular opening 76 of circular internal outline from which the adhesive 18 can be applied to the screw head 50. More particularly, the adhesive 18 is forced through the circular opening 76 onto each of the hexagonal faces 52, whose adjoining corners 78 lie upon an imaginary circle of the same diameter as the circular opening 76 and are thus located thereby. The adhesive 18 finally flows downwardly onto the upper frusto-conical face 56 and is received within a countersunk portion 80 of the adhesive applicator 70.

The cap 40 is then applied to the screw head 50, being orientated if and as necessary, and is pushed downwardly onto the screw head 50. Upper closed end 60 of the cap 40 is then preferably deformed inwardly, for example by means of a plunger, so that when the pressure is released, the closed end 60 resiliently returns to its original non-deformed state and causes at least some of the adhesive 18 which had been expelled to be recovered. In so doing, a more uniform distribution of the adhesive 18 is obtained.

Figure 9:
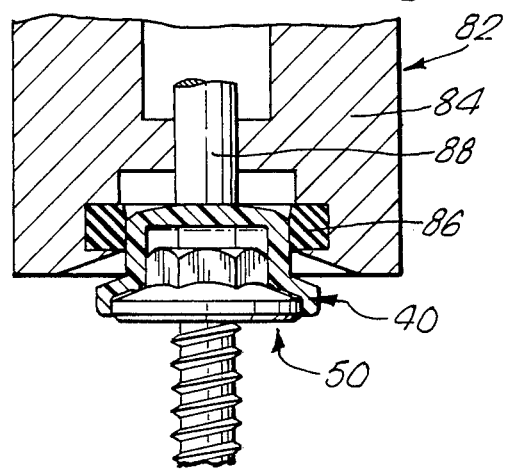
FIG. 9 is a schematic cross-section through a cap applicator for particular use with the second screw/cap assembly.

The cap 40 could be applied and orientated automatically by means of an appropriate cap applicator 82, as shown in FIG. 9. The cap applicator 82 includes a cylinder 84 having an annular rubber ring 86 for releasably carrying the cap 40. To ensure correct orientation, the cylinder 84 is rotated through 60° about its vertical axis as the cap 40 is pressed downwardly by means of the cylinder 84 onto the screw head 50. There may be a rack-and-pinion mechanism with intermeshing splined teeth for rotating the cylinder 84. As soon as correct orientation has been achieved, the cap 40 stops rotating relative to the screw head 50 and starts rotating relative to the rubber ring 86. The cap applicator 82 may also include a plunger 88 which is movable along the vertical axis of the cylinder 84 so as to deform the cap 40 for the above-described purpose.

It will also be noted from FIG. 7 that a diametral clearance 62 has been deliberately introduced between the outer diameter of the head washer portion 58 and the internal diameter of the adjacent skirt portion 64 of the cap 40. The clearance 62 acts as a reservoir to accommodate displaced adhesive 18 arising from the above-noted inward deformation of the closed end 60 of the cap 40. The displaced adhesive 18 forms a capillary bead 66 around the clearance 62 while being cured and thereby provides a simple but effective test that there is sufficient adhesive 18.

Because the head washer portion 58 is unlikely to be truly round as a result of cold forging, whereas the skirt portion 64 is likely to be truly round as a result of molding, the clearance 62 may be of non-uniform radial extent around its circumference. The result is that the adhesive 18 therein resists shear and thereby provides additional torsional strength which could be further improved by, for example, molding serrations upon the inside of the skirt portion 64 or radial corrugations or ribs upon the inside of the recess portion 34 of the cap 40.

It is of particular importance to note that the head can be of standard form capable of use with a conventional socket spanner, rather than being of a special shape which might not be capable of being easily removed from a workpiece in the event of cap breakage, and yet the hexagonal external faces of the preferred head can be readily aligned with the hexagonal internal faces of the preferred cap to ensure maximum strength.

Obviously, many modifications and variations of the present invention are possible in light of the above teachings. It is therefore to be understood that within the scope of the appended claims, the present invention may be practiced otherwise than as specifically described herein.

We claim:
1. A screw/cap assembly, comprising:
   a screw having a head at one end; an initially separate cap mounted upon said head of said screw;
   protrusion means defined upon a first one of said two screw head and cap components so as to engage the second one of said two screw head and cap components and thereby space said screw head and cap components with respect to each other in order to define an adhesive reservoir space therebetween; and
   adhesive means disposed within said adhesive reservoir for fixedly securing said cap upon said screw head.
2. A screw/cap assembly as set forth in claim 1, wherein:
   said protrusion means comprises axially extending ribs for engaging said screw head so as to radially space said cap from said screw head.
3. A screw/cap assembly according to claim 1, in which the adhesive is an epoxy resin of a type which cures when heated for approximately 30 minutes.
4. A screw/cap assembly according to claim 1, in which the cap is formed of a plastics material with an external torque receiving configuration and the screw is formed of a metallic material with a drill tip as well as an external helical thread.
5. A screw/cap assembly as set forth in claim 1, wherein:
   said cap is fabricated from a thermoplastic resin material.
6. A screw/cap assembly as set forth in claim 5, wherein:
   said resin material comprises glass-filled polyester.
7. A screw/cap assembly according to claim 1, in which the head includes an external drive portion extending from a radially enlarged washer portion, and the cap includes an internal drive portion extending from a radially enlarged recess portion.
8. A screw/cap assembly according to claim 7, in which there is a radial clearance between the peripheries of the head washer portion and the cap recess portion for providing an adhesive reservoir.
9. A screw/cap assembly as set forth in claim 7, wherein:
   said protrusion means are disposed upon an undersurface portion of said radially enlarged recess portion for engaging an upper surface portion of said radially enlarged washer portion of said screw head.
10. A screw/cap assembly as set forth in claim 7, wherein:
    said protrusion means comprises axially extending ribs provided upon inner surface portions of said internal drive portion of said cap for engaging outer surface portions of said external drive portion of said screw head.
11. A screw/cap assembly as set forth in claim 7, further comprising:
    peripheral skirt means provided upon said radially enlarged recess portion for annularly surrounding said radially enlarged washer portion of said screw head with sufficient radial spacing defined therebetween for accommodating said adhesive means.
12. A screw/cap assembly according to claim 7, in which the drive portions are of hexagonal outline.
13. A screw/cap assembly according to claim 12, in which:
    said adhesive means is disposed upon each of the said hexagonal faces of said head drive portion as well as said head washer portion.
14. A screw/cap assembly according to claim 7, in which there is an axial clearance between that end of the head drive portion remote from the head washer portion and that end of the cap drive portion remote from the cap recess portion for providing an air reservoir.
15. A screw/cap assembly according to claim 14, in which:
    said end of said cap drive portion which is remote from said cap recess portion has a predetermined amount of resilient flexibility so as to be capable of being inwardly deformed into said air reservoir and resiliently recovering therefrom so as to help achieve a uniform distribution of said adhesive means.
16. A screw/cap assembly comprising a screw having a head at one end which is capped by an initially separate cap stuck onto the head by an adhesive, the head includes an external drive portion extending from a radially enlarged washer portion, and the cap includes an internal drive portion extending from a radially enlarged recess portion, the drive portions are of hexagonal outline, at least one of the cap drive portion and the cap recess portion has a plurality of internal protrusions for maintaining an adequate thickness of the adhesive, the cap is formed of a plastics material with an external torque receiving configuration and the screw is formed of a metallic material with a drill tip as well as an external helical thread.

* * * * *